Sept 17, 1957

H. N. JAMES 2,806,385

ROD HOLDING DEVICE

Filed May 16, 1956

INVENTOR.
Howell N. James
BY Paul O. Pippel
Atty.

Sept 17, 1957    H. N. JAMES    2,806,385
ROD HOLDING DEVICE
Filed May 16, 1956    2 Sheets-Sheet 2
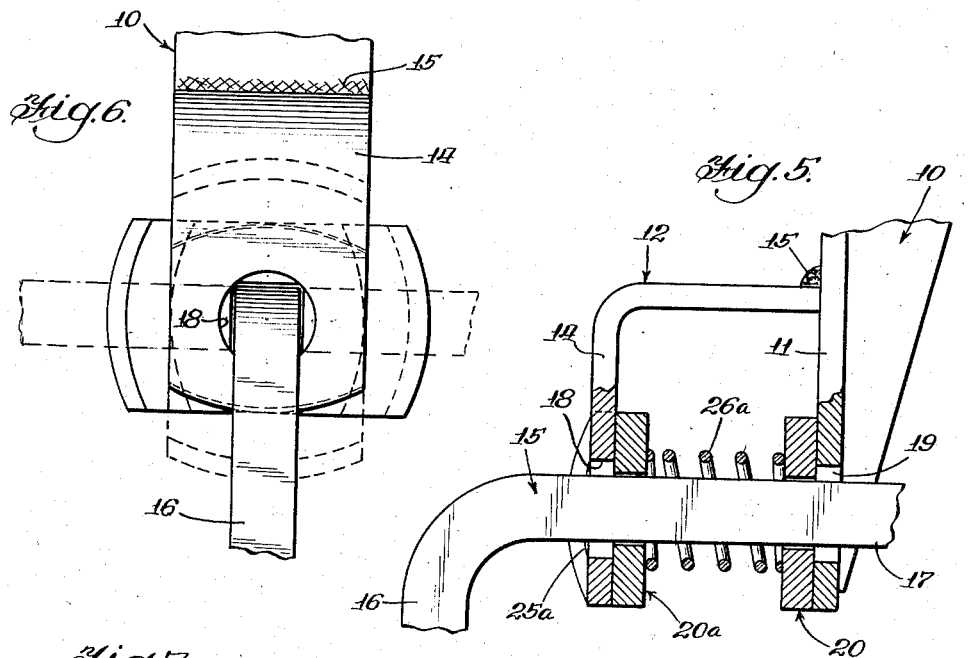
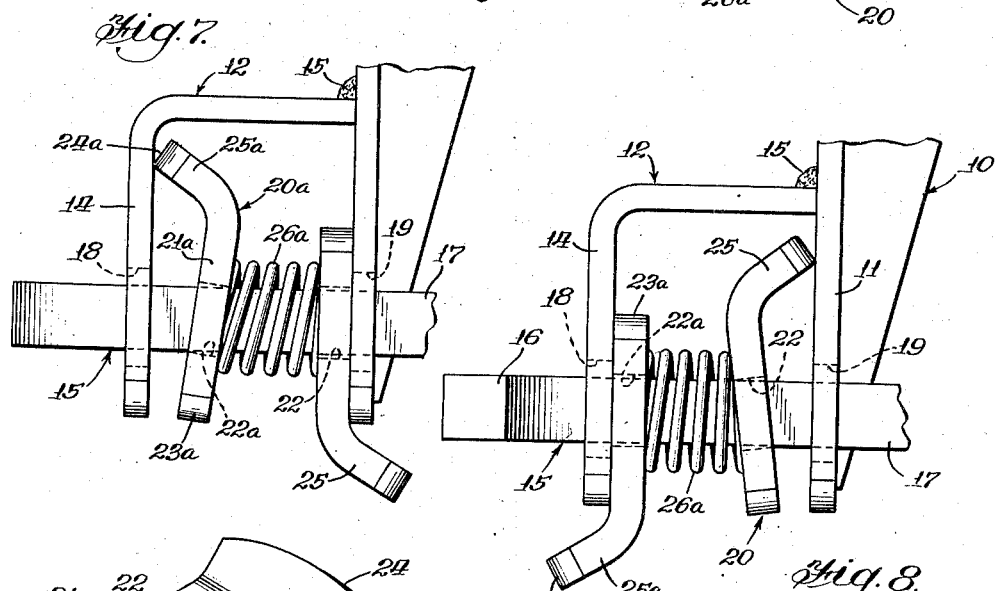
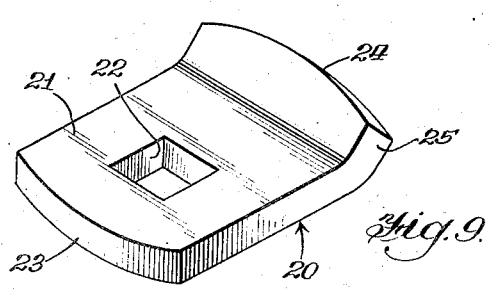
INVENTOR.
Howell N. James
BY Paul O. Pippel
Atty.

United States Patent Office
2,806,385
Patented Sept. 17, 1957

2,806,385
ROD HOLDING DEVICE

Howell N. James, Moline, Ill., assignor to International Harvester Company, a corporation of New Jersey Application May 16, 1956, Serial No. 585,230

7 Claims. (Cl. 74—531)

This invention relates to a new and improved rod holding device.

There have been many mechanisms designed to hold a rod or the like in various extended positions. The pulling and pushing of a rod is a mechanism used to operate numerous devices. Some of these devices require that the rod be held in either a pushed or pulled position of the rod. Still others require that the rod be capable of being held in either a pushed or pulled position and at numerous locations of either a pushing or a pulling.

A principal object of this invention is, therefore, to provide a mechanism for holding a rod in an infinite number of extended positions.

An important object of this invention is the provision of means in a rod holding mechanism for holding a rod in either a pushed or pulled position in any location thereof.

Another important object of this invention is to supply a rod holding device wherein a simple turning of the rod will effect a locking thereof in any extended position of the rod.

Still another important object of this invention is to equip a rod holding device with mechanism wherein a turning of the rod in one direction will lock the rod in any extended position and conversely a turning of the rod in the other direction will lock the rod in any pushed position.

Other and further important objects and advantages will become apparent from the disclosures in the following specification and accompanying drawings, in which:

Figure 5 is a top plan view, partially in section, of a modified rod holding device wherein the rod may be held in either pushed or pulled position;

Figure 6 is an end view of the device of Figure 5;

Figure 7 is another top plan view comparable to Figure 5 but with the rod turned in one direction and fixedly held in pushed position;

Figure 1:
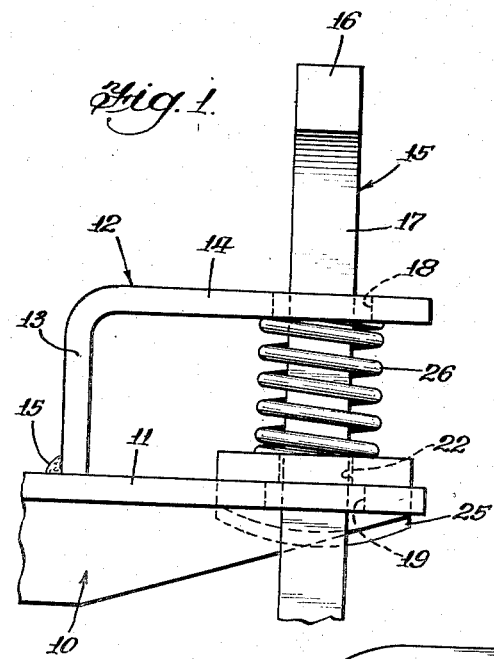
Figure 1 is a top plan view of the rod holding device of this invention.

Figure 8 is still another top plan view of the device of Figures 5, 6 and 7 and is similar to Figures 5 and 7 but with the rod turned in the other direction, thus locking the rod in extended position; and Figure 9 is a perspective view detail of one of the locking elements employed in the devices of Figures 1 through 8.

As shown in the drawings, the reference numeral 10 indicates generally a stationary support having a ledge-like member 11 thereon. A bracket 12 having a wall 13 and a second wall 14 bent at right angles thereto is welded at 15 to the supporting structure 10. The wall 13 is arranged in abutting relationship to the ledge 11, constituting the surface on which the weld between the supporting structure 10 and the bracket 12 is made. The wall 13 lies at right angles to the ledge 11 and the wall 14 lies parallel to and spaced from the ledge 11.

The rod to be moved and held in any desired fixed position is indicated by the reference numeral 15. The rod 15 is square in cross section, but obviously may be any shape other than round, and has a handle portion 16 bent at right angles to a body portion 17. The handle 16 is used to push or pull the rod 15 as desired. The rod 15 freely passes through an enlarged, preferably round opening 18 in the wall 14 of the bracket 12. Similarly, the rod 15 passes through an enlarged, generally round opening 19 in the plate or ledge member 11 on the stationary supporting structure. Before proceeding further, it should be understood that all of the structure 10 and 12 constitutes the stationary supporting structure by reason of the fact that the bracket 12 is welded to the supporting structure 10. Thus the elements 10 and 12 are integral one with the other and the rod 15 moves relatively to the members 10 and 12. Both openings 18 and 19, which are axially aligned one with the other in the parallel members 14 and 11, respectively, are relatively large and permit free rotation of the square shank 17 of the rod 15.

A locking element 20, as shown in detail in Figure 9, is adapted to be carried around the shaft 15 and between the parallel plates 11 and 14. An examination of the element 20 as shown in Figure 9 shows that it is equipped with a substantially flat portion 21 in the form of a plate having a square hole 22 therethrough or other shape matching the cross sectional shape of the rod 15 and arranged and constructed to prevent separate rotation of the rod 15 within the hole 22. The square hole 22 is slightly larger than the square shank 17, but yet the size is not so much larger as to permit rotation of the rod without concurrent rotation of the locking element 20, or to be a sloppy fit. One end of the plate locking member 20 is shown at 23 and is slightly rounded. The other end 24 of the plate-like locking member 20 also rounded is bent angularly away from the plane of the flat portion 21 and constitutes an angled extension 25.

Figure 2:
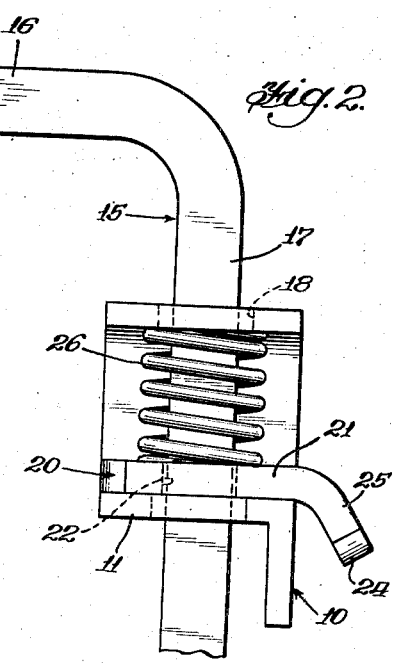
Figure 2 is a side elevational view of the device as shown in Figure 1.
Figure 3:
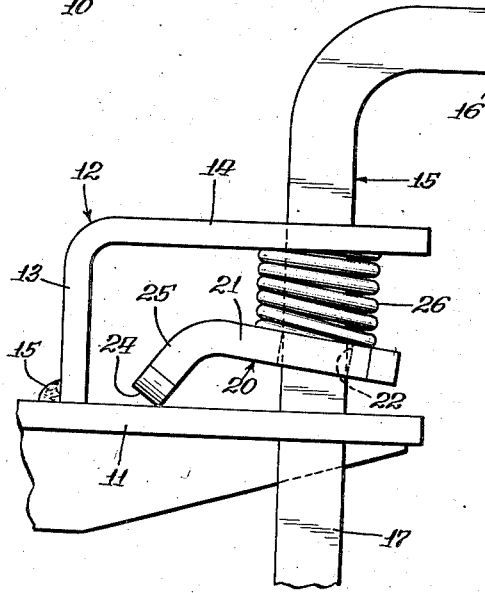
Figure 3 is another top plan view of the device such as shown in Figure 1 but with the rod locked in extended position.
Figure 4:
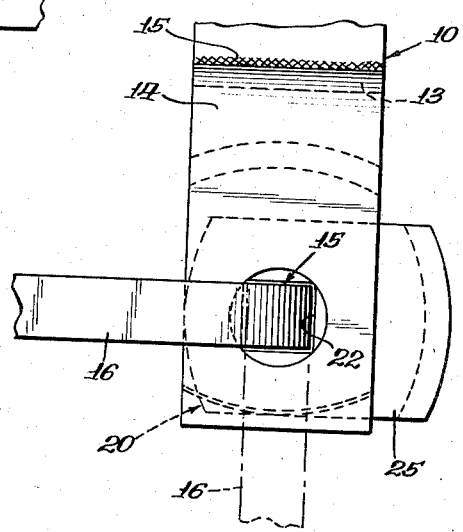
Figure 4 is an end elevational view of the device as shown in Figure 2.

As shown in Figure 1, the flat portion 21 of the locking element 20 lies in abutting relationship with the ledge 11 and has the angled portion 25 thereof hanging down over the side of the supporting member 10, as also shown in Figure 2. The width of the ledge member 11, as shown in Figure 2, is substantially coextensive in length with the flat portion 21 of the locking element 20. Thus, the locking element 20 in the position shown in Figure 2 may have the flat portion in close abutting relationship with the ledge 11 across the full surface of the ledge without the angled portion 25 interfering with this abutting relationship. In this position of the locking element 20 there is no restriction on the movement of the rod therethrough. When the handle 16 is turned there is a concurrent turning of the locking plate member 20 by reason of the similar square hole 22 through which the square rod 17 passes. When the rod 15 is rotated by the handle 16 a quarter turn, such as shown in the position of Figure 3, the rounded end 24 of the angle extension 25 has ridden up over the side of the flat ledge-like member 11 causing the locking member 20 and its flat portion 21 to be raised upwardly by reason of the angle extension 25 and cocked at an angle with the respect to the flat ledge member 11. This causes the snug fitting square opening 22 in the locking member to wedge inwardly on opposite edges against the square shank 17 of the pull rod 15, thus causing the rod to be securely held against inward movement of the rod 15. Inward movement, as shown in the drawing on Figures 1, 2 and 3, means a downward movement. In other words, the rod 15 may be pulled outwardly when the locking member 20 is in the cocking position such as shown in Figure 3, but may not be pushed inwardly until such time as the handle 16 is rotated causing the locking element 20 to be returned to a position such as shown in Figures 1 and 2 wherein the angled portion 25 overhangs the ledge member 11. The reason the rod 15 may be pulled outwardly even though the locking element 20 is wedging the rod 15 is that there is no portion of the locking element abutting against the top plate member 14 of the bracket 12 such as the angle extension 25 contacts the lower ledge member 11 of the stationary supporting structure. A spring 26 surrounds the shank 17 of the rod 15 between the locking element 20 and the upper ledge 14 of the bracket 12. Thus the spring normally urges the locking element 20 downwardly toward the ledge 11. It will be seen in Figures 1 and 2 that the coil spring 26 is substantially extended in holding the flat portion 21 of the locking element 20 against the ledge 11 in abutting relationship and that the coil spring 26 is substantialy compressed when the locking element is in a cocked position and holding the rod 15 against inward or downward movement thereof.

In the operation of the device of Figures 1 through 4, inclusive, it is the function to permit an outward pulling of the rod 15 at all times regardless of the positioning of the locking element 20 and in one position of the locking element to permit free inward movement of the rod 15. In another position of the locking element 20 as shown in Figure 3 wherein the handle 16 of the rod has been rotated a quarter turn, the spring 26 is urging the locking element 20 into a cocked position in which the rod 15 is held to the locking element 20 and prevented from moving inwardly or downwardly, as viewed in Figure 3. However, in this position the rod 15 may be pulled outwardly by the handle 16 to any position and the locking element 20 will automatically effect a locking of the rod 15 at the position in which the rod is stopped. Thus the rod 15 may be held in an infinite number of extended positions depending upon the outward pulling thereof.

The modified form of the invention as shown in Figures 5, 6, 7 and 8 differs from the device of Figures 1 through 4 only in that it is applicable for holding the rod either in extended or pushed position. In all like parts with the earlier device the same reference numerals will be employed. In the modified form of device two locking elements are used and the second one will be given the same reference numerals with an "a" added thereto. The device of Figures 5, 6, 7 and 8 is identical to the device of Figures 1 through 4, inclusive, but for the addition of the second locking plate 20a, as shown in Figures 5, 7 and 8. The second locking element 20a is disposed just beneath the top plate member 14 of the bracket 12. Inasmuch as the spring 26 was disposed between the locking plate 20 and the underside of the ledge 14 in Figures 1 through 4, the spring in the modified device shall be designated as 26a. The spring 26a is a coil spring and surrounds the square shank 17 of the push-pull rod 15. In the modified form of the invention the spring 26a is disposed between the spaced apart locking members 20 and 20a. The locking member 20, as described in conjunction with Figures 1 through 4, lies against the ledge member 11 of the stationary supporting structure 10, whereas the locking plate 20a is arranged to cooperate against the underside of the plate member 14 in the same manner as the locking member 20 engages the ledge 11. It will be recalled that the ledges 11 and 14 are parallel to one another but spaced apart.

In the operation of the modified device of Figures 5 through 8 inclusive, the rod 15 may be pulled or pushed, as desired, to effect operation of any remotely positioned device especially when the locking elements are in the position as shown in Figure 5. In other words, Figure 5 discloses a neutral position of the locking elements 20 and 20a wherein the flat portions 21 and 21a of the locking plates abut the ledge members 11 and 14 respectively. Rotation of the handle 16 of the rod 15 a quarter turn in one direction will cause the locking element 20 to be moved into the position as shown in Figure 8, which is identical to that shown in Figure 3 wherein the push-pull rod 15 is locked against further inward movement until such time as the rod is rotated to effect a rotating of the locking member 20 causing the angled portion 25 to hang over the edge of the ledge 11 thereby permitting the flat portion to reengage in an abutting relationship the ledge 11 whereby no further cocking of the locking element with respect to the shaft or rod will be taking place. Such a movement of the handle 16 to the position as shown in Figure 5 will return the locking elements 20 and 20a to a neutral position whereby the rod may be pushed or pulled, as desired, in any degree desired, and may be held in any desired fixed position merely by rotating the handle 16 in either direction a quarter of a turn. In the position as shown in Figure 8, the rod is prevented from further inward movement and in the position as shown in Figure 7 wherein the handle 16 has been turned one quarter turn in the opposite direction from the neutral position as shown in Figure 5 the rod is prevented from further outward movement. In Figure 7 the locking element 20a is now cocked with respect to the rod 15 and prevents further retraction or outward pulling of the rod 15 except after rotation thereof. In Figure 7 the angled portion 25a of the element 20a has ridden up with its arcuate or curved lower edge 24a over the underside of the ledge 14 causing the flat portion 21a to be raised to an angled position relative to the rod 15 thereby causing the square aperture 22a to dig into the sides of the rod 15 at opposite corners and thereby pinch and hold the rod 15 again outward movement by reason of the abutting of the edge 24a with the underside of the ledge 14.

It should appear obvious from the above description that herein is provided a rod holding device which may be arranged and constructed to hold a rod in either pushed or pulled position either separately or in combination. The device is simple to operate and may be effected by merely a quarter turn of an operating handle. Many applications for a rod holding device exist and the locking mechanism described for the rod herein should be appropriate for many of these jobs. It should be understood that applicant is not limiting the use of the rod holding device described herein to any particular field.

I am aware that numerous details of construction may be varied throughout a wide range without departing from the principles disclosed herein and I, therefore, do not propose limiting the patent granted hereon otherwise than as necessitated by the appended claims.

What is claimed is:

1. A rod holding device comprising, a stationary supporting structure, said stationary supporting structure including spaced apart parallel ledges, said spaced apart parallel ledges having relatively large aligned openings therethrough, a rod having a cross section other than round slidable through said aligned openings, a locking plate having an opening therethrough corresponding in shape to the cross section of the rod to receive passage of the rod, said locking plate disposed between the spaced apart parallel ledges, spring biasing means urging the locking plate against one of said ledges, said locking plate having a flat portion arranged and constructed in one position thereof to abut the ledge against which it is urged, said opening in the locking plate located in the flat portion thereof, means on said locking plate for causing a cocking of said locking plate with respect to said rod upon rotation of said rod.

2. A device as set forth in claim 1 in which, the means on the locking plate includes an angular extension from said flat portion and in one position thereof arranged and constructed to hang over the edge of the ledge against which the locking plate is urged, and in another position thereof to ride up on the ledge and cause the flat portion of the locking plate to be raised and thus cocked against the rod.

3. A device as set forth in claim 2 in which, the rod is provided with a turning handle at one end thereof.

4. A device as set forth in claim 2 in which, the opposite ends of the locking plate are rounded to facilitate riding up and onto the ledge against which the locking plate is urged upon rotation of the rod.

5. A device as set forth in claim 2 in which, a second duplicate locking plate is provided with an opening therethrough corresponding in shape to the cross section of the rod and arranged and constructed to receive the rod and also be positioned between the spaced apart parallel ledges of the stationary supporting structure, said spring biasing means disposed between the spaced apart locking plates and simultaneously urging outwardly on both of said locking plates to cause them to be urged against the spaced apart ledges, said locking plates having their angled extensions disposed in diametrically opposite ends thereof and extending away from each other whereby rotation of the rod in one direction will effect a locking of the rod against further pushing of the rod and whereby rotation of the rod in the other direction will effect a locking of the rod against further pulling of the rod, and whereby the flat portions of each of said locking plates are of sufficient extent to span the width of the respective ledges against which they are urged whereby in a neutral position of the rod the angled extensions hang over opposite sides of the spaced apart ledges and permit free and uninterrupted movement of the rod.

6. A device as set forth in claim 5 in which, the rod is provided with a turning handle at one end thereof.

7. A device as set forth in claim 5 in which, the locking plates have their ends rounded to provide for easy rotational movement of the rod during the climbing of the angle extensions over the ledge.

No references cited.